United States Patent [19]

Bornhauser

[11] Patent Number: 4,988,375
[45] Date of Patent: Jan. 29, 1991

[54] METHOD FOR FITTING A SPHERICAL LENS INTO AN OPTICAL COUPLING DEVICE

[75] Inventor: Christian Bornhauser, Berlin, Fed. Rep. of Germany

[73] Assignee: Siemens Aktiengesellschaft, Berlin & Munich, Fed. Rep. of Germany

[21] Appl. No.: 396,955

[22] Filed: Aug. 22, 1989

[30] Foreign Application Priority Data

Aug. 24, 1988 [DE] Fed. Rep. of Germany ....... 3829067

[51] Int. Cl.⁵ .......................... C03B 23/20; G02B 6/36
[52] U.S. Cl. ........................................ 65/59.4; 65/4.2; 350/96.18; 350/96.20
[58] Field of Search .................... 65/4.2, 4.21, 59.4; 350/96.18, 96.20

[56] References Cited

U.S. PATENT DOCUMENTS

| | | | |
|---|---|---|---|
| 3,950,075 | 4/1976 | Cook et al. | 350/96 |
| 4,404,010 | 9/1983 | Bricheno et al. | 65/4.2 |
| 4,725,117 | 2/1988 | Ellis | 350/96.20 |
| 4,726,648 | 2/1988 | Haberland et al. | 350/96 |

FOREIGN PATENT DOCUMENTS

| | | |
|---|---|---|
| 0191328 | 10/1986 | European Pat. Off. . |
| 0256892 | 8/1987 | European Pat. Off. . |
| 3534366 | 4/1987 | Fed. Rep. of Germany . |
| 8706844 | 10/1988 | Fed. Rep. of Germany . |
| 0644948 | 8/1984 | Switzerland . |
| 2148536 | 5/1985 | United Kingdom . |
| 2190764 | 11/1987 | United Kingdom . |

OTHER PUBLICATIONS

Applied Optics, vol. 21, No. 19, Oct. 1982, pp. 3475-3483, "Low-Loss Lens Connector for Single Mode Fibers", FIG. 6.
JP-A-63 149 611, Patent Abstracts of Japan, vol. 12, No. 413, 11/2/88.

*Primary Examiner*—Robert L. Lindsay
*Attorney, Agent, or Firm*—Kenyon & Kenyon

[57] ABSTRACT

A method for making an airtight and highly precise fitting for a spherical lens in a cylindrical opening within a metallic body. The spherical lens is axially pressed into the opening where the diameter of the opening is smaller than the diameter of the spherical lens. The diameter of the cylindrical opening is designed so that the spherical lens plastically deforms the metallic body when it is inserted into the opening.

12 Claims, 1 Drawing Sheet

METHOD FOR FITTING A SPHERICAL LENS INTO AN OPTICAL COUPLING DEVICE

BACKGROUND OF THE INVENTION

The present invention relates to a method of forming a high precision hermetic seal by axially inserting a spherical lens into a cylindrical opening in a metal body, wherein the spherical lens has a larger diameter than the cylindrical opening.

When coupling a light waveguide to another optical component, merely placing the end face of the waveguide as close as possible to the other optical component may nevertheless attenuate the light at the coupling. It is often better to insert a spherical lens between the end of the waveguide and the optical component because the spherical lens can cause less attenuation of the light in the coupling.

It is often important in the foregoing coupling to locate at least one of the elements in a hermetically sealed space. The hermetic seal prevents the component from coming in contact with undesirable influences such as moisture. For example, if a light waveguide is coupled to a light emitting diode (LED), the LED needs to be well protected. It follows that a spherical lens that is located between the light emitting diode and the end face of the fiber of the wave guide should form a hermetic seal with the wall of the housing to thus enclose the light emitting diode.

European Patent Application EP A2 0,191,328, corresponding to U.S. Pat. No. 4,726,648, shows a hermetically sealed fitting for a lens. This application describes a spherical lens that is intergrown with a ring so that the ring folds over the lens to form a hermetic seal around the circumference of the spherical lens. The ring is inserted and hermetically sealed to the wall of the housing. The housing contains a photo diode or a laser diode that is coupled to a light waveguide via the inserted lens. Providing hermetic seals at both the lens and the housing, however, is expensive.

Another way to seal a lens into a housing wall is described in U.S. Pat. No. 3,950,075. This patent discloses inserting a glass lens into a plastic ring that has an inside diameter that is smaller than the outside diameter of the lens. The lens deforms the ring so that the elasticity of the ring material forms a hermetic seal. However, it has been found that the long term stabilitY of the tightness of this connection is unsatisfactory.

European Patent Application EP A 0,256,892 describes a hybrid plug for a connector in which spherical lenses are axially pressed into the openings of a metallic body. Experience has shown, however, that fastening a spherical lens with a press fit does not always form a hermetic seal. The seal leaks in response to temperature fluctuations because the material of the spherical lens and the metal have different coefficients of expansion for different temperatures.

There is a need to fit a lens into a metallic housing wall to form a hermetic seal. The tightness of the sealed fit o needs to be reliable over the long term without incurring unjustifiable manufacturing costs.

SUMMARY OF THE INVENTION

The present invention solves the problem of forming a hermetic seal between the metallic housing wall and a spherical lens by inserting the spherical lens into a smaller cylindrical opening in a metallic body. The diameter of the body is selected less than the diameter of the sphere, by an amount that depends on the properties of the metallic body such that the inside wall of the cylindrical opening of the metallic body experiences a plastic deformation in the region traversed by the spherical lens.

The method of the present invention has the advantage of forming a hermetic seal through the tight fit formed by the combination of the elastic forces of the metallic body on the spherical lens and the plastic deformation of the metal caused by the spherical lens. Another advantage is that the connection remains relatively airtight for a long time since neither the material comprising the spherical lens nor the metallic material is expected to age.

The spherical lens can be made of sapphire to ensure that the lens will not be destroyed when it is pressed into the metallic body. Further, a spherical lens can be made from synthetic sapphire with high precision.

The method of the invention can be improved by making the metallic body from steel alloy in which the cylindrical opening is a bore hole. The bore hole should have a diameter that is less than the diameter of the spherical lens. The diameter of the bore hole in this embodiment is at most 98 percent of the diameter of the lens, and preferably between 96% and 97% of the diameter of the spherical lens.

The metallic body can be machined to close tolerances if made of steel alloy. The metallic body is very resistant to mechanical stress such as abrasion or damage by shocks. If the o spherical lens is made of sapphire, the diameter of the bore hole in the metallic body can be much smaller than the diameter of the lens because a sapphire sphere can withstand the larger forces needed to insert it into the bore hole.

It has been found to be advantageous to make the diameter of the bore hole between 96 percent and 97 percent of the diameter of the spherical sapphire lens. This range of diameters provides that the plastic deformation of the metal combine with its elastic forces to produce a reliably tight connection between the spherical lens and the metallic body. The force needed to press the spherical lens into the bore hole are still manageable. In any event, the diameter of the bore hole normally should not exceed 98 percent of the diameter of the spherical lens since a looser fit could allow leaks in the connection to occur in production.

The method of the present invention also contemplates first making a bore hole in the metallic body with a larger diameter than the diameter of the spherical lens and then pressing a sleeve made of a soft, ductile metallic material such as aluminum or a nickel silver alloy into the bore hole so as to make an airtight connection with the metallic body. The inside diameter of the sleeve is smaller than the diameter of a spherical lens. A spherical lens of glass or sapphire is then inserted axially into the sleeve.

This method has the advantage that the spherical lens is pressed into a bore hole that is made of a relatively soft metal. The forces that act on the spherical lens when it is pressed into the bore hole are therefore relatively small compared to the forces that act upon the sleeve when it is pressed into the steel alloy body. The danger of breaking a spherical lens made of glass while inserting it into a bore hole is thus reduced.

One embodiment contemplates that the sleeve is made of nickel silver and has an inside diameter of between 97 percent and 99 percent of the diameter of the spherical lens. If the sleeve is made of aluminum, the inside diameter of the sleeve can be between 97 percent and 98.5 percent of the diameter of the spherical lens. The aforementioned ranges for the ratio of the inside diameter of the sleeve and the larger outside diameter of the spherical lens ensure forming the maximum yield of reliably airtight fittings in the manufacturing process. That is, there will be a minimum number of rejected parts, either because of breakage of the lens or because of an imperfect seal.

If the inside diameter of the sleeve is too small, the forces on the spherical lens when it is inserted into the bore hole become so large that a glass lens must be expected to fracture. If the inside diameter of the sleeve is too large, the elastic forces that act through the material of the sleeve after the initial plastic deformation of the metallic body are not great enough to ensure a tight, hermetic seal. The elastic forces that act on the lens must always be great enough to compensate for any small unevenness on the surface of the spherical lens or on the inside surface of the bore hole.

The method of the present invention can be improved by first sizing the inside surface of the opening in the metallic body with a reamer. The spherical lens is then inserted into the opening. The inside surface of the opening can easily be machined to the accuracy required using a reamer.

Alternatively, the invention contemplates first honing the inside surface of the opening in the metallic body. The spherical lens is then inserted into the opening. Machining the inside surface of the opening to the required accuracy also can be done using an automatic device.

The method of the present invention can also be implemented by first inserting a calibrating sphere through the opening in the metallic body. The diameter of the calibrating sphere is smaller than the diameter of the spherical lens and larger in diameter than the inside diameter of the opening. The spherical lens is subsequently pressed into the opening of the metallic body.

Inserting the calibrating sphere brings the inside surface of the bore hole or of the sleeve to an accurately defined dimension. The inside surface of the bore hole or the sleeve is also smoothed. The elastic forces required to form a tight connection are thereby reduced. The inside diameter of the bore hole relative to the sleeve can be somewhat larger, if the surface is very smooth, than the diameter required if the surface is rough. The diameter of the bore hole must remain, of course, less than the outside diameter of the spherical lens. Using a calibrating sphere in this manner reduces the forces required to press the spherical lens into the bore hole or the sleeve. The danger of damaging the spherical lens when pressing it into the bore hole or sleeve is thus reduced.

Another embodiment of the method uses a sensor to control the motion of inserting the lens into the bore hole or the sleeve. The sensor protrudes into the end of the opening toward which the lens is pressed and delivers, for a defined axial position of the spherical lens within the opening, a signal that can be used to stop pushing the lens. An appropriate sensor can reproducibly position the spherical lens at the correct point in the opening to within 5 um accuracy. The sensor permits inserting the spherical lens using an automated device. It is important to achieve efficient light transmission from the optical fiber to the optical component or vice versa. The efficiency of this coupling depends strongly on the spherical lens being located at the proper position between the optical elements being coupled.

DETAILED DESCRIPTION

Figure 1:
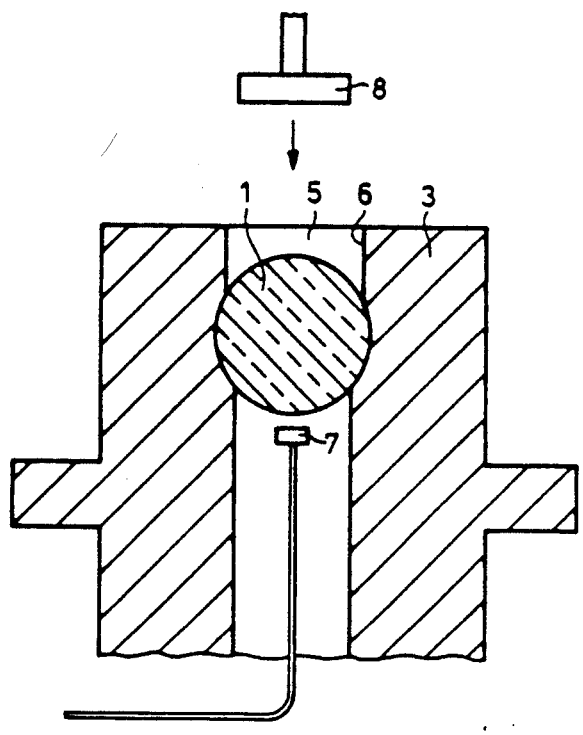
FIG. 1 is an enlarged cross section of a steel alloy coupling with a pressed-in spherical lens according to the method of the present invention.

FIG. 1 is an enlarged cross section showing a steel alloy coupling 3 having a cylindrical bore hole 5. The inside surface 6 of the bore hole 5 is smoothed by suitable processing such as reaming or honing. The spherical lens 1, which can be made of sapphire, is pressed into the bore hole 5 by the plunger 8 until the sensor 7 responds and delivers a signal to stop pressing the lens into the bore hole. The sensor 7 can operate optically or mechanically. The bore hole in the alloy steel coupling 3 has a larger diameter in the region traversed by the spherical lens when inserted than in the region which the spherical lens has not traversed.

The bore hole 5 can be traversed by a calibrating sphere before inserting the spherical lens. The calibrating sphere brings the bore hole to the correct dimension and simultaneously smooths the wall of the bore hole. The coupling is hermetically sealed on the housing of a light emitting diode, not shown. The connector pin at the end of the light waveguide is plugged into the coupling on the other side. Using sensor 7 to stop pressing the lens into the bore hole ensures that the spherical lens 1 is accurately positioned in the axial direction. The accuracy of the axial positioning is sufficient to achieve optimum imaging between the end face of the light waveguide and the optical component to be coupled.

The spherical lens 1 is automatically centered in the radial direction within the bore 5 when inserted. The inside wall of the bore hole is deformed partly plastically and partly elastically. The elastic deformations exert elastic forces on the spherical lens 1 that remain constant practically indefinitely. These forces also provide reliable tightness at temperatures of up to 200° C. While the elastic forces decrease with increasing temperature, these forces increase again when the coupling cools off. If the magnitude of these forces reaches the yield point of the metal, additional plastic deformation occurs so that the elastic forces decrease in magnitude.

Figure 2:
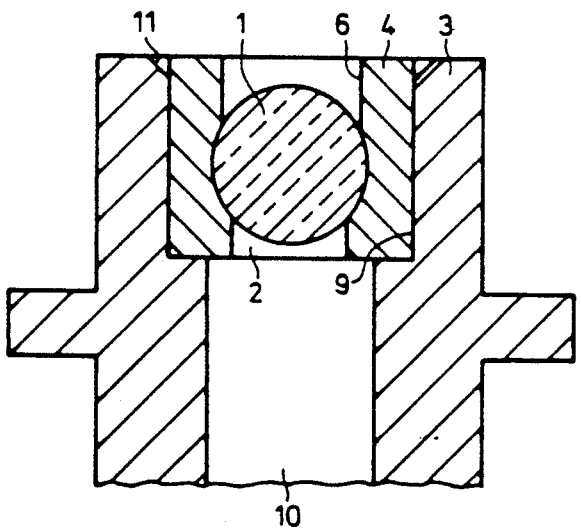
FIG. 2 is an enlarged cross section of a steel alloy coupling into which an aluminum sleeve and a spherical lens have been pressed.

FIG. 2 shows an enlarged cross section of a steel alloy coupling 3 which has a bore hole 10. An aluminum sleeve 4 has been pressed into an enlarged end of the bore hole 10. A chip-removing action is preferably not used to insert the aluminum sleeve 4 into the enlarged bore hole 9 in the steel alloy coupling 3 due to the chamber II on the steel alloy coupling 3. A chip removing action can cause grooves in the material surfaces which could result in leaks.

The inside surface of the sleeve 4 is processed only after inserting the sleeve into the steel alloy coupling 3. Adjusting the inside diameter of the sleeve outside the steel alloy coupling is not productive because the sleeve may be deformed when it is pressed into the steel alloy coupling. The spherical lens 1 is then pressed into the opening 2 of the sleeve 4. The spherical lens 1 can be made of glass, although a sapphire sphere can also be used. The steel alloy coupling 3 forms a hermetic seal with spherical lens 1. A closed, hermetically sealed housing on one side of the hermetic seal can enclose an opto-electronic semiconductor component. The other end of the coupling has a precise stop which allows for positioning the pins of a light waveguide in the coupling with the required degree of accuracy.

What is claimed:

1. A method for making a highly precise, airtight fit of a spherical lens within a metallic body, forming a cylindrical opening in the metallic body, the diameter of the cylindrical opening being sufficiently smaller than the diameter of the spherical lens that insertion of the spherical lens into the opening will result in plastic deformation of an inside wall of the opening of the metallic body, and axially pressing the spherical lens into the cylindrical opening thereby plastically deforming an inside wall of the opening of the metallic body, such that the diameter of said cylindrical opening is enlarged due to said plastic deformation.

2. A method as claimed in claim 1, wherein the metallic body comprises steel alloy and the cylindrical opening is a bore hole with a diameter that is no greater than 98 percent of the diameter of the spherical lens.

3. A method as claimed in claim 2, wherein the cylindrical opening has a diameter between 96 percent and 97 percent of the diameter of the spherical lens.

4. A method as claimed in claim 1, further comprising boring a cylindrical hole into the metallic body with a diameter that is larger than the diameter of the spherical lens, and then pressing a sleeve of a soft, ductile metallic material into the cylindrical hole, the inside diameter of the sleeve forming the cylindrical opening.

5. A method as claimed in claim 4, wherein the soft, ductile metallic material comprises a metal selected from the group consisting of nickel silver and a hardenable aluminum alloy.

6. A method as claimed in claim 4, wherein the spherical lens is made from a material selected from the group consisting of glass and sapphire.

7. A method as claimed in claim 4, wherein the sleeve has an inside diameter between 97 percent and 99 percent of the diameter of the spherical lens.

8. A method as claimed in claim 4, wherein the sleeve is made of aluminum and has an inside diameter between 97 and 98.5 percent of the diameter of the spherical lens.

9. A method as claimed in claim 1, further comprising sizing the cylindrical opening with a reamer.

10. A method as claimed in claim 1, further comprising honing the inside surface of the cylindrical opening before inserting the spherical lens.

11. A method as claimed in claim 1, further comprising pressing a calibrating sphere through the opening in the metallic body before inserting the spherical lens, the diameter of the calibrating sphere being smaller than the diameter of the spherical lens and greater than the inside diameter of the cylindrical opening.

12. A method as claimed in claim 1, further comprising sensing the axial position of the spherical lens inside the cylindrical opening while the lens is being pressed into the opening, bringing a signal out the opposite end of the cylindrical opening that is indicative of the position of the spherical lens, and stopping insertion of the spherical lens within the cylindrical opening at a predetermined position as indicated by the signal.

* * * * *